United States Patent
Kahn et al.

(10) Patent No.: US 7,690,556 B1
(45) Date of Patent: Apr. 6, 2010

(54) STEP COUNTER ACCOUNTING FOR INCLINE

(75) Inventors: Philippe Kahn, Aptos, CA (US); Arthur Kinsolving, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 362 days.

(21) Appl. No.: 11/698,633

(22) Filed: Jan. 26, 2007

(51) Int. Cl.
*G01C 22/00* (2006.01)

(52) U.S. Cl. .................. 235/105; 702/160; 702/155; 702/158; 482/8; 377/24.2

(58) Field of Classification Search ................. 235/105; 702/160; 377/24.2
See application file for complete search history.

(56) References Cited

U.S. PATENT DOCUMENTS

| | | | |
|---|---|---|---|
| 5,976,083 A * | 11/1999 | Richardson et al. | 600/300 |
| 5,989,200 A * | 11/1999 | Yoshimura et al. | 600/587 |
| 6,493,652 B1 * | 12/2002 | Ohlenbusch et al. | 702/160 |
| 6,522,266 B1 | 2/2003 | Soehren et al. | |
| 6,813,582 B2 | 11/2004 | Levi et al. | |
| 6,898,550 B1 | 5/2005 | Blackadar et al. | |
| 7,561,960 B2 | 7/2009 | Soehren | |
| 2005/0033200 A1 | 2/2005 | Soehren et al. | |
| 2005/0054938 A1 * | 3/2005 | Wehman et al. | 600/483 |
| 2005/0272564 A1 * | 12/2005 | Pyles et al. | 482/54 |
| 2006/0020177 A1 * | 1/2006 | Seo et al. | 600/300 |
| 2006/0064276 A1 * | 3/2006 | Ren et al. | 702/160 |
| 2007/0260418 A1 | 11/2007 | Ladetto et al. | |
| 2008/0254944 A1 * | 10/2008 | Muri et al. | 482/8 |

FOREIGN PATENT DOCUMENTS

JP 11347021 A * 12/1999

* cited by examiner

*Primary Examiner*—Michael G Lee
*Assistant Examiner*—Suezu Ellis
(74) *Attorney, Agent, or Firm*—Blakely, Sokoloff, Taylor & Zafman, LLP; Judith A. Szepesi

(57) ABSTRACT

A method and apparatus for a step counter system is described. The step counter system comprises an accelerometer to detect motion of a user, a step calculation logic to utilize the motion detected by the accelerometer to detect and count steps, and an incline logic to calculate an incline of a surface on which the user moved.

24 Claims, 4 Drawing Sheets

STEP COUNTER ACCOUNTING FOR INCLINE

FIELD OF THE INVENTION

The present invention relates to step counters, and more particularly to an improved step counter.

BACKGROUND

A step counter is a device that counts each step a person makes. Step counters are becoming popular as means of measuring exercise, and to motivate people to move. Generally, step counters count the number of steps taken during the day. Step counters can give encouragement to improve health. Step counters are increasingly becoming embedded in more and more personal mobile devices such as mobile phones. Some health advocates recommend taking 10,000 steps per day for a healthy lifestyle. Some simple step counters use a mechanical switch to detect steps together with a simple counter while newer step counters use linear accelerometers, also known as inertial sensors, to detect steps. Some step counters attempt to estimate the number of calories a user is burning through taking the counted number of steps. In prior art, these caloric burn estimations are based on a user profile (height, weight and sometimes stride length) and may also take into consideration the walking speed. However, these prior art step counters are not accurate in calculating the amount of calories expended as they do not account for walking on inclines as opposed to flat surfaces. The angle of an incline has a dramatic effect on a user's caloric burn and is not accounted for prior art step counters.

SUMMARY OF THE INVENTION

A step counter comprising an accelerometer to detect motion of a user, a step calculation logic to utilize the motion detected by the accelerometer to detect and count steps, and an incline logic to calculate an incline of a surface on which the user moved.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus described is an improved step counter, or motion calculation system, which provides credit for motion made on the incline. Generally speaking, step counters simply count steps and provide a measurement of the speed at which these steps were taken. However, the incline of the slope on which steps are taken has a substantial effect on the effort required and caloric burn associated with taking the steps. Steps taken on a flat surface are less aerobically intensive than steps taken on an upward incline and thus should be differentiated from one another in an accurate step counter. Treadmills account for this variation, but step counters do not. The step counter system of the present application accounts for the variation in exercise level based on the incline.

Figure 1:
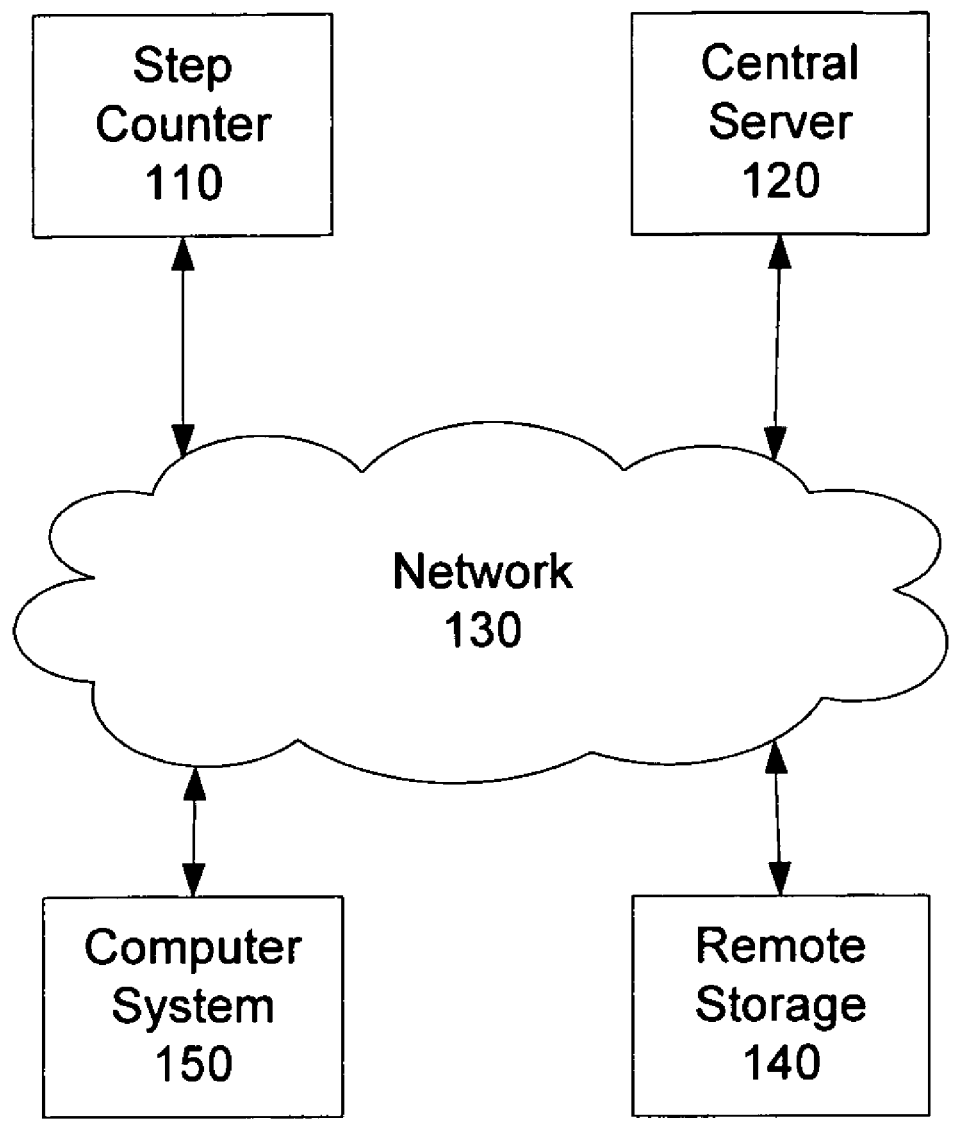
FIG. 1 is a block diagram of one embodiment of a network system including the step counter and server.

FIG. 1 is a block diagram of one embodiment of a network system including the step counter and server. In one embodiment, a first step counter 110 is coupled via a network 130 to a central server. In one embodiment, the step counter 110 is intermittently coupled to the network 130. In another embodiment, the step counter 110 may be completely independent. In another embodiment, the step counter 110 may be designed to be coupled to a local computer 150, which in turn is coupled to the network 130 and through the network to the server 120.

The central server 120 is a health server for collecting health data. In one embodiment, central server 120 is a general health server designed to collect, correlate, and share health data from multiple monitors, sensors, and devices. The step counter is one such device, which may also include a heart monitor, glucose meter, blood pressure monitor, and others. One embodiment of a central server which may be utilized with the present invention is described in co-pending patent application Ser. No. 11/192,549, filed on Jul. 29, 2005, entitled "Monitor, Control, and Share (MACS) System". In one embodiment, the central server 120 performs some of the calculations, as described below.

In one embodiment, the communication from the step counter 110 to the central server 120 includes step and incline data. In one embodiment, the communication from the central server 120 to the step counter 110 includes personal data of the user, which may be used by the step counter 110 to calculate calorie expenditure of the user. In another embodiment, the central server 120 may perform this calculation. In one embodiment, the central server 120 may transmit the result of these calculations back to the step counter 110. The split of functionality between the step counter 110 and central server 120 may be arbitrarily defined, except that the step counter 110 obtains the accelerometer data, and in some embodiments other sensor data. As noted above, in one embodiment, the step counter 110 may be completely independent and the server 120 may be absent. In another embodiment, the step counter 110 may simply collect sensor data, and in one embodiment display results, while all calculations are made on the server 120.

In one embodiment, the step counter 110 may be any mobile device including an accelerometer, which is capable of collecting accelerometer data, and either performing calculations, transmitting accelerometer data to the central server 120, or both. The central server 120 may perform all of the calculations. In one embodiment, the data may be stored on a remote storage medium 140, which may be a database or other storage medium. In one embodiment, the remote storage medium 140 may be part of the server 120. In one embodiment, the remote storage medium may be a distributed storage.

In another embodiment, the step counter 110 may be a dedicated device designed to perform step calculations and incline calculations. In one embodiment, the step counter 110 may be independent of the central server 120. In one embodiment, if that is the case, the user may separately connect to the central server 120 via computer system 150, to transfer the step counter data manually.

Figure 2:
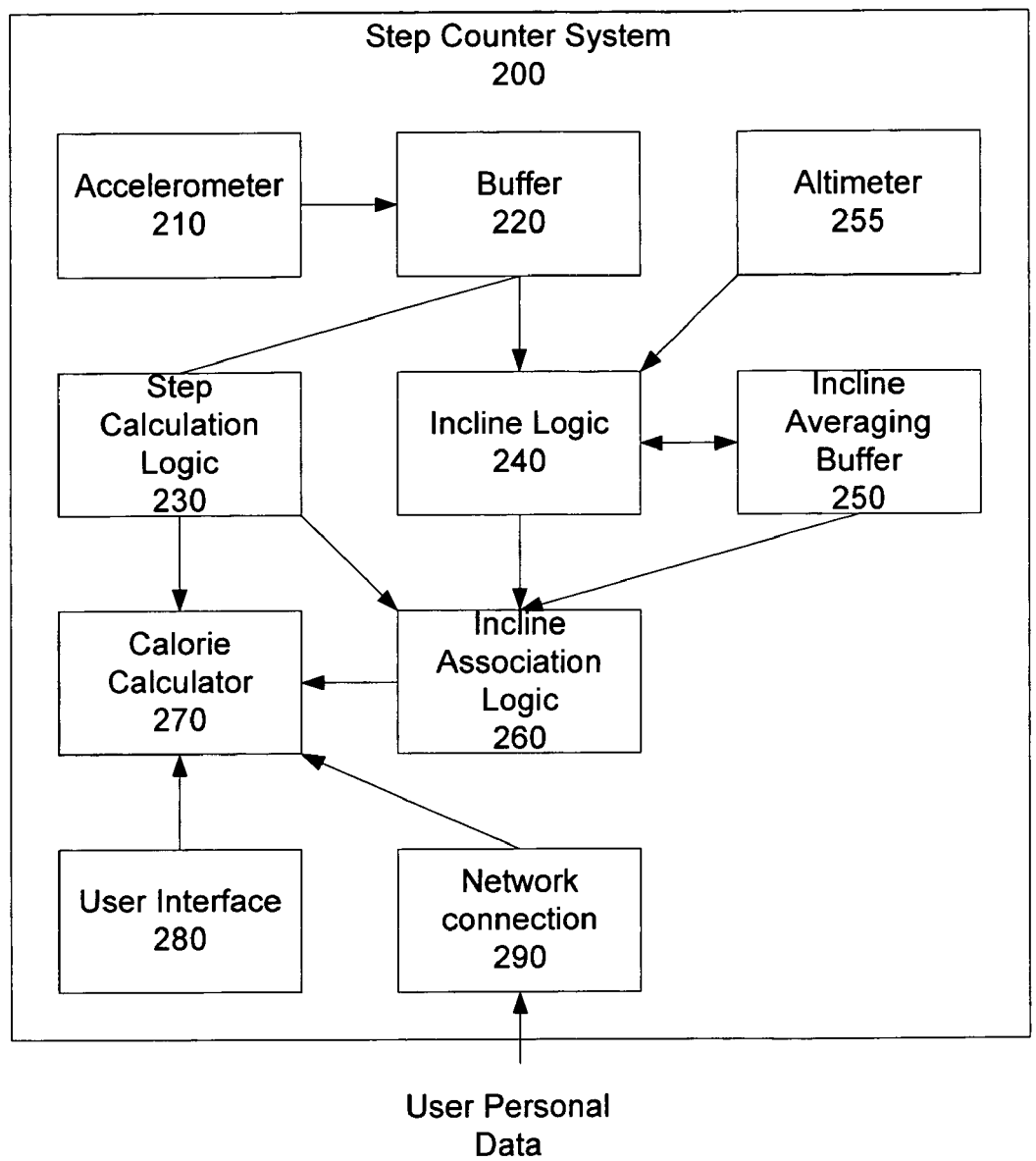
FIG. 2 is a block diagram of one embodiment of the step counter system.

FIG. 2 is a block diagram of one embodiment of the step counter system. The step counter system 200's functionality may be distributed between a server and a client. The step counter system 200 in one embodiment includes an accelerometer 210. In another embodiment, the accelerometer 210 may be external to the system, with only accelerometer data being received by the system from the external accelerometer 210.

The accelerometer data is in one embodiment sent to buffer 220. The accelerometer data is used by step calculation logic 230 to calculate steps taken by the user. In one embodiment, the calculation system described in co-owned application Ser. No. 11/192,549 is used by step calculation logic 230.

The accelerometer data is further used by incline logic 240, to determine an incline associated with a step. A step includes three parts, a vertical travel up, a horizontal travel, and a vertical travel down. The difference between the vertical travel up and the vertical travel down is the incline. In one embodiment, the incline logic 240 calculates the incline for each step. In one embodiment, the system includes an incline averaging buffer 250, to enable the calculation of an averaged incline. In one embodiment, the system averages the incline over a period of several steps.

In one embodiment, the system may further include an altimeter 255, or pressure sensor. In one embodiment, the altimeter 255 may be calibrated using network triangulation for a mobile phone based step counter system 200. In one embodiment, if global positioning system (GPS) data is available, it may be used to calibrate the altimeter. The altimeter's output indicates the change in altitude. This information is used, in one embodiment, by incline logic 240 to determine the incline. In one embodiment, the data from the altimeter 255 and accelerometer 210 are used in combination to get a more accurate measurement of the slope. The combination provides an accurate measurement of the incline. Knowing that an object is moving and quantifying how it is moving helps in determining whether pressure changes sensed by the altimeter 255 are due to changes in altitude or weather. Furthermore, changes in pressure as detected by the altimeter 255, while a device is in motion, will help more accurately describe the motion of the object and, specifically, the change in altitude.

Incline association logic 260 adds the incline data to each step data. In one embodiment, step calculation logic 230 outputs only a step count, rather than the step data. In one embodiment, the incline association logic 260 associates an initial incline level with the data. The incline association logic 260 then associates a delta (i.e. change in incline) with following steps. This reduces the amount of data used when the user walks on a consistent incline for a period. In another embodiment, an actual incline level is associated with each step. In another embodiment, an incline average is calculated by incline association logic 260, over an exercise period, and only the average is associated with the data. In another embodiment, a new incline is calculated and associated with the data whenever the user's walking cadence changes. In general, users change their cadence when the road incline changes by a significant percentage.

In one embodiment, calorie expenditure calculator 270 calculates a user's calorie expenditure based on the step and associated incline data. In one embodiment, the calorie expenditure calculator 270 utilizes personal data of the user to calculate the calories expended. The personal data may include one or more of the following: the user's height, the user's weight, the user's heart rate, and the user's stride length. In one embodiment, this data is obtained directly from the user, via a user interface 280. In one embodiment, this data is obtained from a server, via a network connection 290. In one embodiment, the system attempts to obtain the data from the server, and whatever data is not available from the server is obtained from the user via user interface 280.

Figure 4:
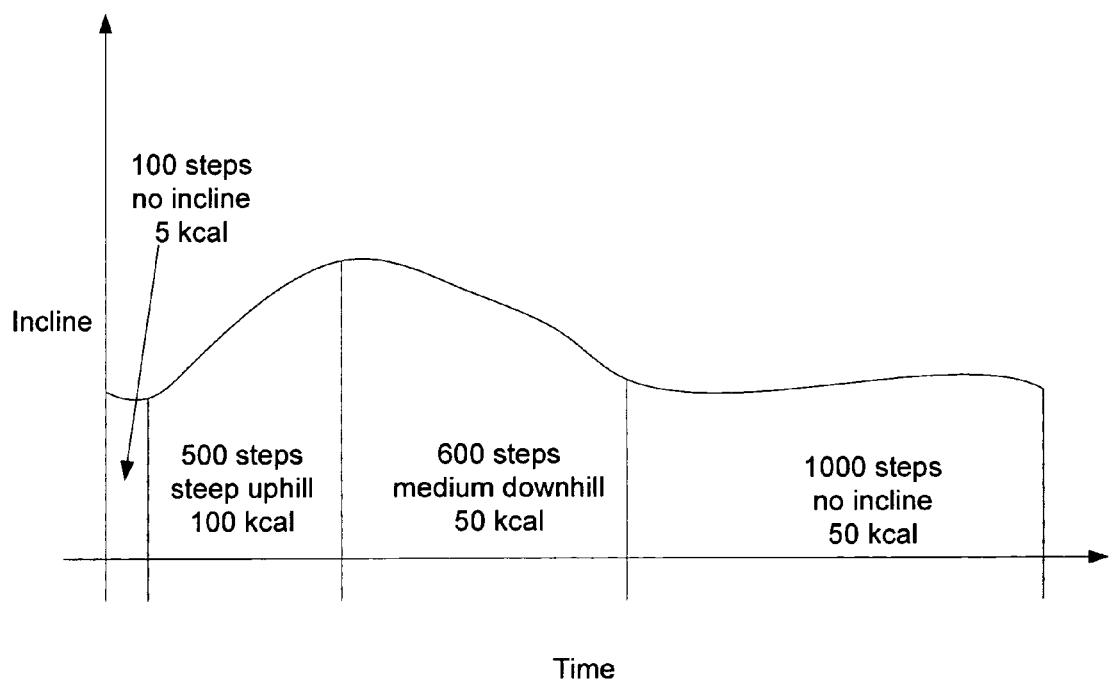
FIG. 4 is an illustration of one embodiment of the output that may be shown to the user.

In one embodiment, the user interface 280 may be used to display to the user his or her calorie expenditures. FIG. 4 illustrates one example of an output which may be presented to the user. As can be seen, the output includes a graph illustrating the overall incline during the walk. In one embodiment, the output further includes a total calorie count for the walk. In one embodiment, the output actually includes calorie counts for each of the incline segments. This illustrates graphically to the user the differences associated with walking on various inclines. In this way, a more accurate representation of a user's effort may be determined and an accurate estimation of caloric expenditure may be determined. In one embodiment, this display may be available via a web interface. In another embodiment, a simplified version of this display may be available on the mobile device hosting the accelerometer.

Figure 3:
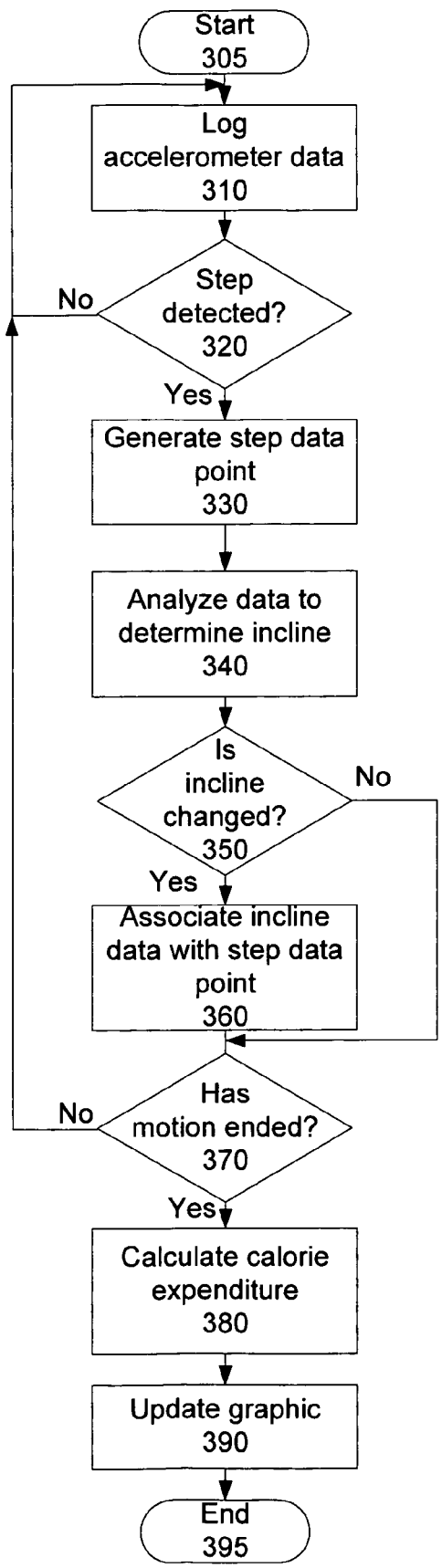
FIG. 3 is a flowchart of one embodiment of the system.

FIG. 3 is a flowchart of one embodiment of the system. The process starts, in one embodiment, when the accelerator detects motion. In one embodiment, the accelerometer is continuously monitoring for motion.

At block 310, accelerometer data is logged. The user's stepping motion may be measured by various types of accelerometers (inertial sensors). A simple inexpensive step counter uses a two-axis accelerometer and requires that the user place the device in a certain position so that the stepping motion can accurately be measured. More advanced step counters use a tri-axis accelerometer to allow the device to measure steps regardless of where the device is placed. Alternatively, the user's motion may be detected by two two-axis accelerometers, or another detection mechanism which provides motion data.

At block 320, the process determines whether a step has been detected. As noted above, this may be done using the mechanism described in co-pending application Ser. No. 11/192,549, or another mechanism.

If a step has been detected, at block 320, the process continues to block 330. Otherwise, the process returns to block 310 to continue collecting accelerometer data.

At block 330, a step data point is generated. At block 340, the accelerometer data is analyzed to determine an incline associated with the step. In one embodiment, in addition to using accelerometer data, additional sensor data may be used to more accurately determine the incline. In one embodiment, the additional sensor may be a pressure sensor, or altimeter. In one embodiment, the process continues directly to block 360, and associates the incline with the step data. In another embodiment, the process continues to block 350.

At block 350, the process determines whether the incline has changed from a previously calculated incline. If so, the process continues to block 360, and the new incline value is associated with the step data. If not, the process continues directly to block 370.

At block 370, the process determines whether the motion has ended. If not, the process returns to block 310, to continue logging acceleration data. If the motion has ended, the process continues to block 380.

At block 380, in one embodiment, a calorie expenditure calculation is performed for the user, based on the step data, incline data, and in one embodiment the user's personal data such as weight, height and stride length. In another embodiment, this step may be skipped. In another embodiment, this may happen at a separate time, in an off-line setting.

At block 390, in one embodiment, a graphical illustration of the user's progress, including the incline data, is created. In another embodiment, this may happen at a separate time, in an off-line setting. In another embodiment, this step may be skipped.

The process then ends at block 395. In this way, the system utilizes the accelerometer data to provide data about the incline, and the corresponding change in calorie expenditure to the user.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A step counter system comprising:
   an accelerometer to detect motion of a user;
   a step calculation logic to utilize the motion detected by the accelerometer to detect and count steps; and
   an incline logic to utilize the motion detected by the accelerometer to make a calculation of an incline of a surface on which the user moved for one or more of the steps, wherein the calculation is performed for a step based on identifying a vertical travel up portion of the step, identifying a vertical travel down portion of the step, and computing a difference between the vertical travel up portion and the vertical travel down portion of the step.

2. The step counter system of claim 1 further comprising a calorie expenditure calculator to calculate a calorie expenditure for the user based on the steps and incline data.

3. The step counter system of claim 2, further comprising an interface to enable a user to input his or her personal data, the personal data used to calculate the calorie expenditure.

4. The step counter system of claim 3, wherein the interface comprises a network interface to enable the step counter system to obtain the personal data from a server.

5. The step counter system of claim 3, wherein the personal data comprises one or more of the following: height, weight, stride length, and heart rate.

6. The step counter system of claim 1, further comprising:
   the incline logic to average inclines calculated for a plurality of steps.

7. The step counter system of claim 1, wherein each step is associated with a cadence of the user, the step counter system further comprising:
   the incline logic to calculate a new incline when the user's cadence changes.

8. The step counter system of claim 1, further comprising:
   an altimeter to determine a change in altitude;
   the incline logic to utilize the change in altitude to make an additional calculation of the incline of the surface, and to verify the calculation of the incline using the additional calculation of the incline.

9. A system comprising:
   a motion detection apparatus to detect three dimensional motion of a user on a surface;
   an incline logic to utilize the motion detected by the motion detection apparatus to make a calculation of an incline of the surface to associate with user steps, wherein the calculation is performed for one or more of the user steps based on identifying a vertical travel up portion of the step, identifying a vertical travel down portion of the step, and computing a difference between the vertical travel up portion and the vertical travel down portion of the step; and
   an energy calculation logic to calculate a calorie expenditure of the user, based on the three dimensional motion of the user, wherein the energy calculation logic takes into account the incline of the surface.

10. The system of claim 9, wherein the motion detection apparatus is an accelerometer, and the accelerometer data is used to calculate the incline of the surface.

11. The system of claim 9, the system further comprising:
    an altimeter to determine a change in altitude;
    the incline logic to utilize the change in altitude to make an additional calculation of the incline of the surface and to verify the calculation of the incline using the additional calculation of the incline.

12. The system of claim 9 further comprising further comprising an interface to enable a user to input his or her personal data, the personal data used to calculate the calorie expenditure.

13. The system of claim 12, wherein the interface comprises a network interface to enable the step counter system to obtain the personal data from a server.

14. The system of claim 9, interface further comprising:
    the incline logic to average inclines calculated for a plurality of steps.

15. The system of claim 9, wherein the personal data comprises one or more of the following: height, weight, stride length, and heart rate.

16. The system of claim 9, wherein each step is associated with a cadence of the user, the system further comprising:
    the incline logic to calculate a new incline when the user's cadence changes.

17. A method comprising:
    receiving data from an accelerometer, the data indicating a motion of a user in three dimensions;
    calculating, by a mobile device, user step data based on the accelerometer data; and
    calculating an incline by the mobile device, and associating the incline with the step data, wherein for one of more of the steps the incline is calculated by identifying a vertical travel up portion of the step, identifying a vertical travel down portion of the step, and computing a difference between the vertical travel up portion and the vertical travel down portion of the step.

18. The method of claim 17, further comprising:
    detecting a change in altitude using an altimeter; and
    utilizing the change in altitude to verify the incline of the surface.

19. The method of claim 17, further comprising:
    calculating a calorie expenditure for the user based on the step data and the incline data.

20. The method of claim 17, further comprising:
    using personal data of the user to calculate the calorie expenditure.

21. The method of claim 20, further comprising:
    connecting to a health server to obtain the personal data about the user.

22. The method of claim 20, wherein the personal data comprises one or more of: height, weight, stride length, and heart rate of the user.

23. The method of claim 17, further comprising:
    transmitting the accelerometer data to a server for calculations.

24. The method of claim 17, wherein each step is associated with a cadence of the user, the method further comprising:
    calculating a new incline when the user's cadence changes.

* * * * *